Jan. 27, 1953 R. E. MOORE 2,626,670
PROPELLER CONTROL
Filed Oct. 8, 1945 4 Sheets-Sheet 1

Fig. 1.

INVENTOR.
RICHARD E. MOORE
BY Spencer, Hardman & Fehr
His ATTORNEYS

INVENTOR
RICHARD E. MOORE
BY
Spencer, Hardman & Fehr
HIS ATTORNEYS

Jan. 27, 1953    R. E. MOORE    2,626,670
PROPELLER CONTROL
Filed Oct. 8, 1945    4 Sheets-Sheet 4

INVENTOR
RICHARD E. MOORE
BY
Spencer, Hardman & John
His ATTORNEYS

Patented Jan. 27, 1953

2,626,670

UNITED STATES PATENT OFFICE 2,626,670

PROPELLER CONTROL

Richard E. Moore, Dayton, Ohio, assignor to General Motors Corporation, Detroit, Mich., a corporation of Delaware Application October 8, 1945, Serial No. 621,004

22 Claims. (Cl. 170—160.21)

This invention relates to controllable pitch propellers for aircraft that are automatically responsive to changes in speed for shifting the blade inclination to make for best efficiency of engine operation.

The principal object of the invention is to prevent overspeeding of the propeller when a change in speed of the prime mover occurs.

Propellers that have blades with high built-in forces tending to shift the blade to decrease pitch require a high increase-pitch application of force to hold the blades at the required angle during normal governed operation. If that force is suddenly released, it is easily conceivable that the blades will immediately begin to decrease pitch. If the force operating to hold the blades at the required angle is that of a fluid medium under pressure, then the rate of the decrease of blade angle will be controlled by the restriction to flow of the pressure fluid from the blade shifting unit in accordance with the tendency for the blade to seek the decrease pitch position.

It is therefore an object of this invention to prevent overspeeding of a controllable pitch propeller by restricting the rate of change in decrease-pitch movement of the blades.

Another object of the invention is to provide a system of control for variable pitch propellers that affords a normal operating force for assisting the blade movement to decrease pitch, and a higher operating force for holding the blade movement against tendency to move to decrease pitch and for shifting the blade to increase pitch, with restricting means for limiting the maximum rate of change.

Still another object of the invention is to provide a valve and linkage articulation in which an angle slot lever produces adequate damping to prevent the erratic and reversing flow forces to start the governor valve chattering thereby causing unstable control.

These and other objects of the invention are accomplished by providing a high capacity pressure source for operating the blade torque-units through the selective control by a governor mechanism, the potential of the pressure delivered to the governor mechanism being variably controlled so that it is raised to a higher value on movement of the governor mechanism to demand more force, and introducing controlled resistance to movement of the governor mechanism, with restricted drain back of fluid pressure from the blade torque-units when the governor mechanism is distributing the fluid pressure to the decrease pitch side of the torque unit.

Further objects and advantages of the present invention will be apparent from the following description, reference being had to the accompanying drawings wherein a preferred embodiment of the present invention is clearly shown.

Figure 1:
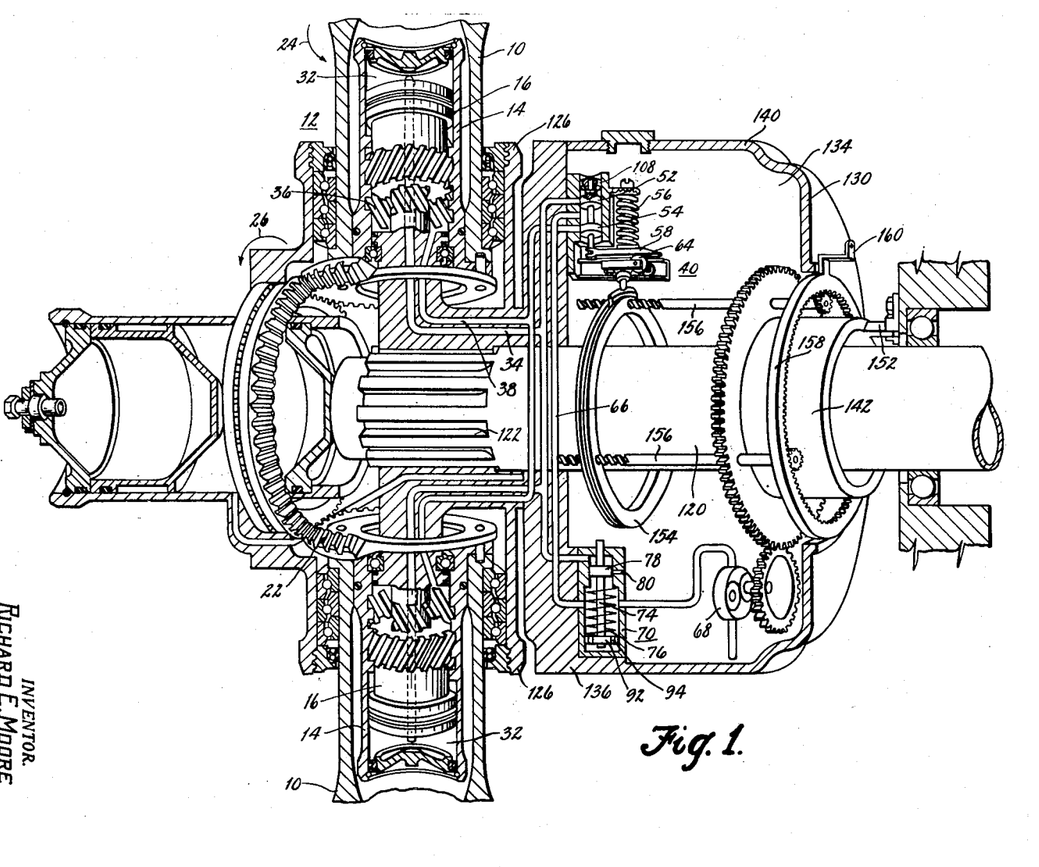
Fig. 1 is a schematic view of a control system for variable pitch propellers involving the instant invention.
Figure 1A:
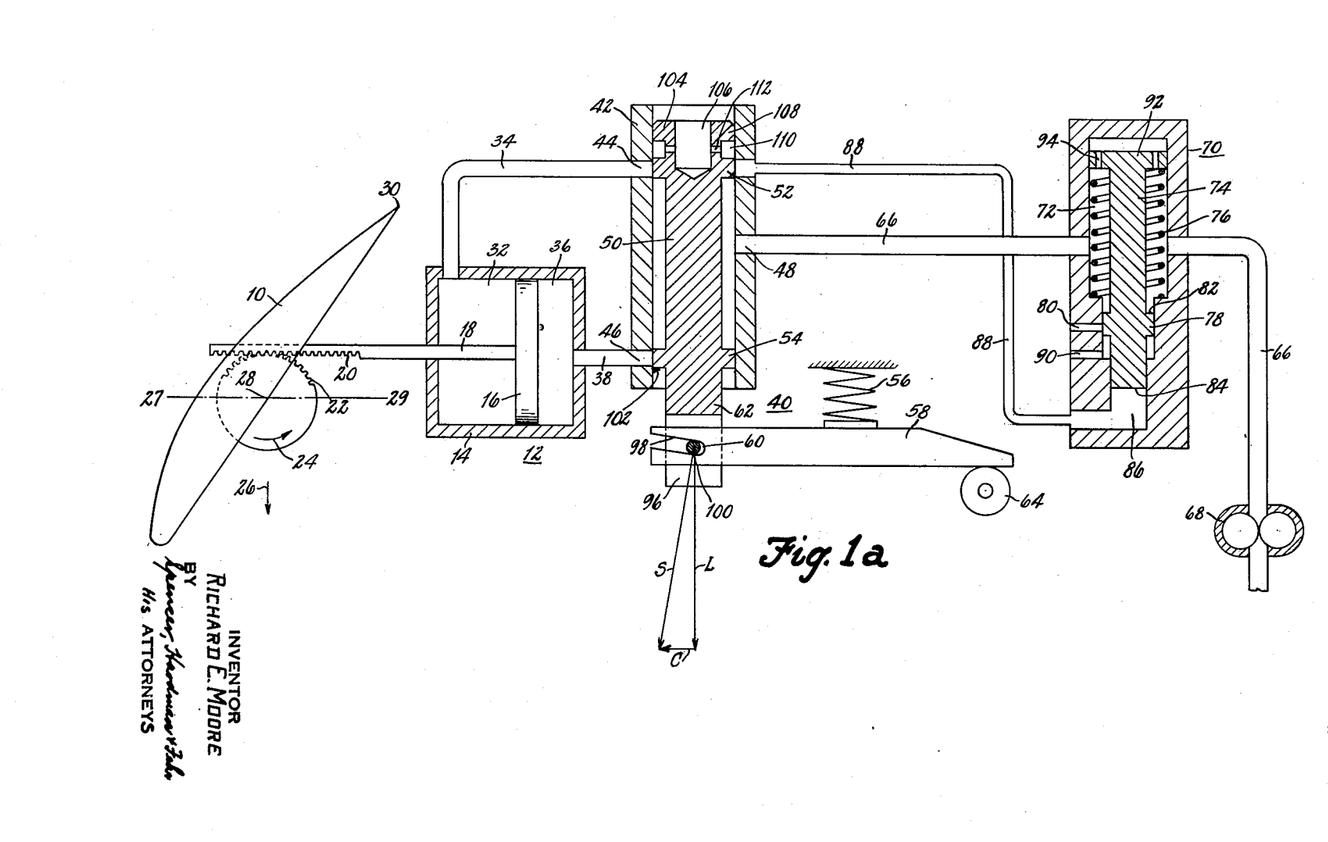
Fig. 1a is a diagrammatic view of the invention, illustrating the ports in simplified circuit connection.

Referring specifically to the drawing, and first with respect to Fig. 1a, 10 refers to a single blade of a propeller mechanism that is mounted in a socket of a hub for pitch shifting movement by means of a torque-unit 12. Here the torque-unit comprises a cylinder 14 and piston 16, the latter of which is provided with a rod 18 ending in a rack 20 interengaging with a gear 22 fast to or driving the blade 10 in its pitch shifting movements. The blade is so constructed that it has a tendency to shift toward the decrease pitch position as indicated by the arrow 24 when the propeller is rotated in the direction of the arrow 26 about the propeller shift axis 27—29, which tendency may be by reason of the center of pressure, or the center of mass of the blade being located between the axis of pitch rotation 28 and the trailing edge 30 of the blade.

The torque unit is operated by application of fluid under pressure to either side of the piston 16, such as the chamber 32 and passage 34 for increase pitch shift, or the chamber 36 and passage 38 for decrease pitch shift. The application of fluid pressure to one side or the other of the torque unit is determined by the action of a governor mechanism 40 that provides a porting sleeve 42 with control ports 44 and 46 leading to the passages 34 and 38 respectively, and a pressure source port 48. A valve plunger 50 slidable along the sleeve has control port lands 52 and 54 adapted in the on-speed position to substantially cover the control ports 44 and 46 respectively. The on-speed position is determined by the balance of opposing forces acting on the valve plunger 50, including centrifugal force acting upon the member 50 tending to move it in one direction along the sleeve 42, and an opposing force of a spring 56 acting upon a lever 58 articulated at 60 to an extension 62 of the plunger, the opposite end of the lever 58 resting on a fulcrum 64.

A fluid medium under variable pressure is supplied to the governor mechanism through the port 48 by a passage 66 that connects with the outlet of a high capacity pump 68, the potential of the pressure being controlled by a pressure control valve 70 that secures a pressure of normal or relatively low value always available at the port 48 for maintaining the system completely filled with fluid, and for operating low force required units, and immediately steps up the potential of the pressure to meet the requirements for operating higher force required units. The pressure control unit 70 provides a chamber 72 inserted in the passage 66 and thereby always subject to the potential of the pressure from the pump 68, and houses a plunger 74 spring-urged by 76 to one end of the chamber 72 in which position a land 78 of the plunger 74 completely covers a relief or blow-off port 80, which when open reduces the pressure in the chamber 72 and passage 66.

The potential of pressure in the passage 66 and chamber 72 at the instant of relief or blow-off through port 80 is determined by the resultant of forces acting upon the plunger 74, and includes centrifugal force and the urge of spring 76 acting to thrust the plunger 74 outwardly to close the port 80, and opposed by the pressure of the fluid within the chamber 72 acting against the annular face 82 of the land 78 and against the top surface of head 92 of piston 74 (by way of apertures 94) to move the plunger inward to open the port 80. In Fig. 1a, centrifugal force acts upon both the valve member 50 of the governor mechanism and the plunger 74 of the pressure control valve, to move them outward which is toward the top of the sheet. From this it will be seen that the pressure control valve 70 acts to variably limit the low stage of pressure in the system in accordance with the speed of rotation, for which reason the limit of pressure in the system for a propeller that is rotating at a slow speed will be a little lower than the limit of pressure in the system for the same propeller rotating at a faster speed. The pressure so limited is suitable for distribution by the governor mechanism and may be sufficient to maintain the blades at the required angle during normal governed operation, and is sufficient for assisting the blades in their movement toward decrease pitch. A greater pressure potential is required or desired to make a quick shift in the increase-pitch direction, for which reason means are incorporated for automatically increasing that potential when the work to be done by the torque-units is increased.

An extension of the control valve plunger 74 provides a small piston face 84 confined in a chamber 86 which has a fluid connection by way of the passage 88 with the increase-pitch port 44 of the governor mechanism. Thus, when the governor valve member 50 moves to a position to distribute fluid under pressure to the pitch-increase port 44, the potential of that pressure will also be applied to the passage 88, chamber 86 and against the piston face 84 to assist centrifugal force and spring force on plunger 74 in keeping the port 80 closed. The potential of the pressure in the passage 66 and bore of the porting sleeve 42 and control port 44 is therefore suddenly increased to fill the needs of the work to be done by the torque-unit connected with port 44. To insure that the pressure control valve 70 will promptly respond to the variable forces that may be applied to it, the back side of the land 78 is relieved by a passage 90, and the plunger 72 is provided with a dash-pot head 92 that is relieved by passages 94 therethrough.

Further control of the forces applied to the torque unit are embodied in the construction of the governor mechanism and include means for restricting the drain of fluid from the torque unit, and a controlled resistance to movement of the valve member when it shifts from one position to another. The last is incorporated in the articulation 60 between the lever 58 and the extension 62 of the member 50. The extension 62 is slotted at 96 to receive one end of the lever 58 which is provided with a slot 98 at an incline to its length as shown and straddles a pin 100 extending across the slot 96 of the extension 62. That articulation is such that spring force exerted on the lever is applied substantially as indicated by the arrow L, but the inclination of the slot 98 introduces such component as indicated by the arrow S, with the result that there is a tendency to move the valve member 50 laterally in the direction of the arrow C as indicated. That lateral component of force on the valve member 50 tends to cock it against one side of the bore of the sleeve 42 as indicated at 102, and slightly increases the resistance to movement or produces damping to chattering of the valve.

Figure 2:
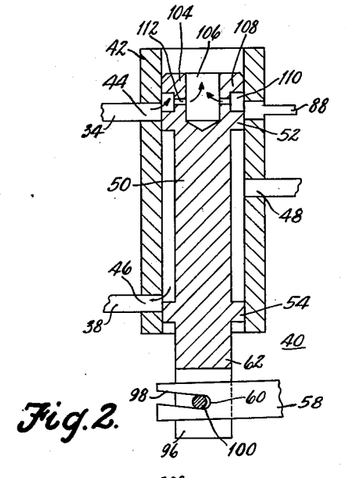
Fig. 2 is a diagrammatic detail illustrating the relation of the parts of the governor mechanism when distributing force for decrease of pitch.
Figure 3:
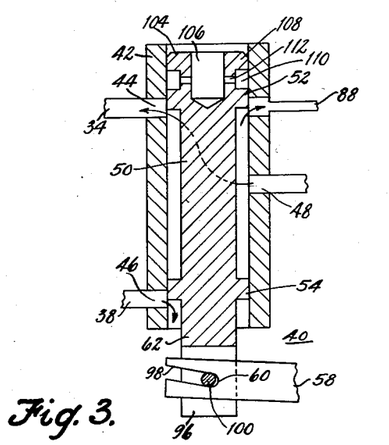
Fig. 3 is a similar view illustrating the relation of the parts when distributing force for increase of pitch.

Limiting the rate of decrease-pitch change is also controlled by restricting the drain from the increase-pitch side of the torque unit, and is accomplished by extending the valve member 50 outwardly at 104 beyond the increase pitch land 52 and drilling it out at 106 to extend beneath an additional land 108 and an annular groove 110 between the lands 52 and 108. Small passages 112 are then drilled to connect the groove 110 and drilling 106. Figs. 2 and 3 illustrate the relation of the parts in effecting the limiting control of the pitch shifting movement, Fig. 2 designating a distribution of pressure fluid to the torque-unit for decreasing the pitch, and Fig. 3 designating a distribution of the pressure fluid to the torque-unit for increasing the pitch. In both instances as also in Fig. 1, the valve member 50 is subjected to the opposing forces of the spring 56 through the lever 58 and centrifugal force, one or the other dominating according to the position of the valve member, but the spring force always being present, the lateral cocking of the member 50 to the side of the bore of the sleeve 42 is always present. When the valve member is distributing the fluid pressure to the decrease port as indicated in Fig. 2, then ports 48 and 46 are in communication with the passage 38 so that the fluid may flow into the piston chamber 36, with a return flow from the chamber 32 through the passage 34 and out through the control port 44. That pressure impulse is in assistance to the tendency of the blade to turn to the decreased-pitch position. It need not and in fact should not be great enough to cause a sudden or too great a shift, and is herein controlled by the additional land 108 and the restricted drain holes 112. In this shifted position of the valve member 50 the channel 110 is open to the control port 44, so that drain from the torque-unit therethrough must flow through the restrictions 112. The small arrows indicate the path of the fluid pressure flowing through the governor mechanism.

When the valve member is distributing the fluid pressure to the increase-pitch port 44 as indicated in Fig. 3, then ports 48 and 44 are in communication, so that fluid under pressure is delivered to the chamber 32 of the torque-unit in opposition to the tendency of the blade to shift, thereby effecting a shift by the torque-unit to an increase-pitch position. Return from or drain from the torque-unit is through the passage 38 and control port 46. At the same time that distribution is being made to the port 44, the passage 88 is also subjected to the pressure from port 48 through which it exerts itself on the small piston face 84 of the pressure control valve to step up the potential of the pressure in passage 66. There is then available a greater pressure force for the torque-unit function that is doing the greater part of the work, that is, a greater force is directed to the torque-unit for effecting shift in a pitch-increase sense, and the rate of shift of the blade by the torque-unit for decrease of pitch it limited by the restricted port of its drain. The tendency of the valve to hunt and vibrate during any distributing movement is reduced by the lateral cocking of the distributing valve in its porting sleeve.

Figure 12:
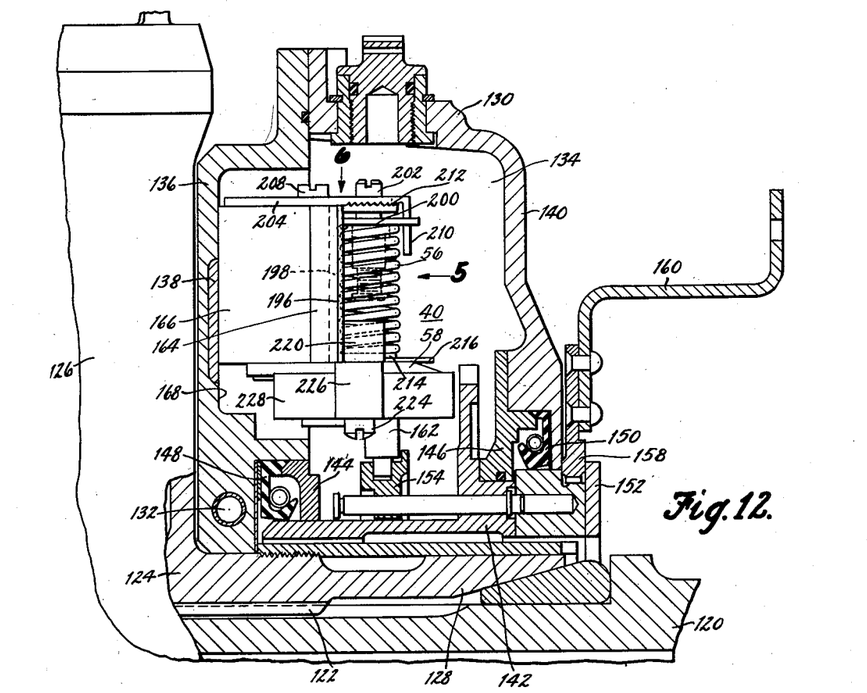
Fig. 12 is a structural view with the governor mechanism shown in elevation, and making application of the invention illustrated in the foregoing figures.

A structural application of the features of the invention adopted in a propeller mechanism are shown in Figs. 4 to 12 inclusive, where Figs. 4 to 11 relate to a governor mechanism, and Fig. 12 illustrates its mounting and inclusion of a hydraulic regulator for an aircraft propeller. With that in mind, consider that 120 refers to a propeller shaft that extends from and rotates with respect to an engine nosing or gear casing, and has driving relation through splines 122 with a propeller hub 124 that provides a plurality of sockets 126 in which the blades 10 are mounted for pitch shifting movement. The hub has an extension 128 on which is mounted a regulator 130 containing a quantity of operating fluid and control mechanism such as the pump 68, the pressure control valve 70, the governor mechanism 40, all hydraulically connected by passages, such as 132 so that fluid contained within the enclosure 134 of the regulator may be drawn therefrom and delivered under pressure to the torque-units within the sockets. The regulator embodies a plate 136 enclosing several of the passages 132 that end with appropriate pads 138 to which is secured the elements of the control apparatus, here shown to be the governor mechanism 40, the respective units and pads having cooperating and complementarily positioned ports or openings such that the fluid circuit is properly made upon clamping the element of control mechanism in place upon the plate 136.

A cover member 140 secured to the plate 136 cooperates with an adapter assembly 142 for completing the enclosure 134, the assembly having a journal bearing at 144 and 146 with the plate 136 and cover 140, along with lift-off fluid seals 148 and 150. The assembly is restrained against rotation with the propeller by a part 152 anchored to the engine structure, and provides a control ring 154 operated by control shafts 156 from an oscillatable ring gear 158 for selecting the speed setting at which the propeller is to operate. Linkage or cables from the cockpit connect with the lever 160 and may effect the axial movement of the control ring 154 along the adapter assembly, so as to actuate a carriage 162 that supports the fulcrum 64 that is engaged by the lever 58 of the governor mechanism. Referring to Fig. 1a, as the fulcrum is moved closer to or further from the point of spring pressure upon the lever, the relation of opposing forces applied to the lever and valve are altered and a different speed is selected at which the balance of forces will ensue. A schematic arrangement of this structure as applied to a propeller of the type disclosed in Blanchard et al. 2,307,101, is shown in Fig. 1, hereof.

Figures 4, 5, 6:
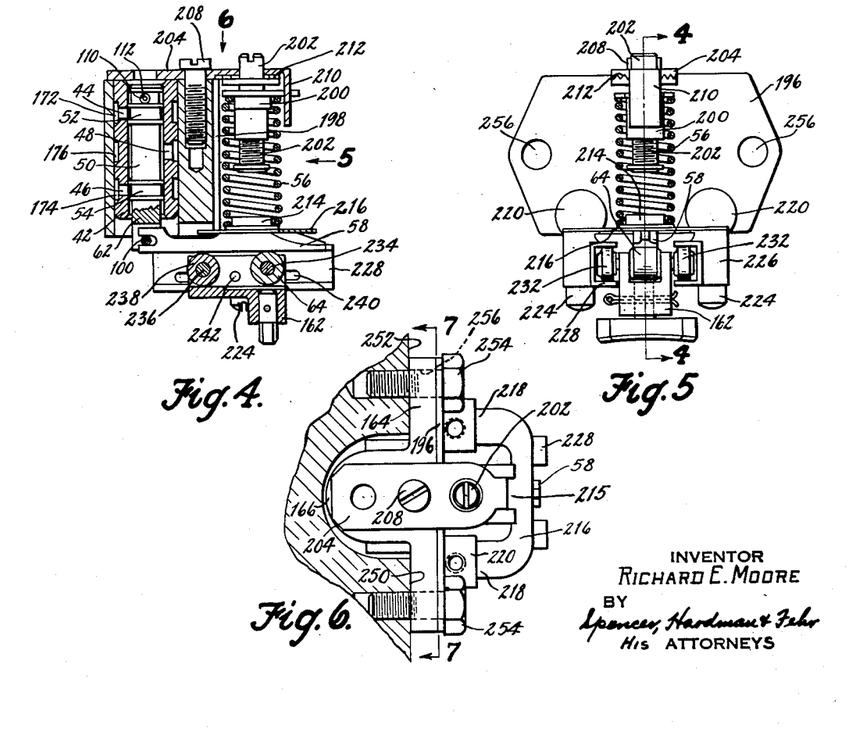
Fig. 4 is a mid-sectional view through the governor mechanism substantially as indicated by the line and arrows 4—4 of Fig. 5.
Fig. 5 is an elevational view of the governor mechanism substantially as indicated by the arrow 5 in Figs. 4 and 12.
Fig. 6 is a top plan view of the governor mechanism substantially as indicated by the arrows 6 in Figs. 4 and 12.
Figure 7:
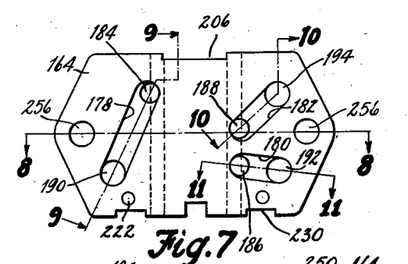
Fig. 7 is an elevational view of the supporting plate of the governor mechanism substantially as indicated by the line and arrows 7—7 of Fig. 6.
Figure 8:
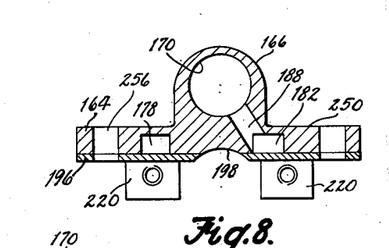
Fig. 8 is a transverse sectional view therethrough substantially as indicated by the line and arrows 8—8 of Fig. 7.
Figure 9:
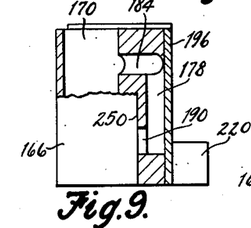
Figs. 9, 10 and 11 are fragmentary sectional views showing the porting arrangement of the governor valve mechanism substantially as indicated by the lines and arrows 9—9, 10—10, and 11—11 respectively of Fig. 7.
Figures 10, 11:
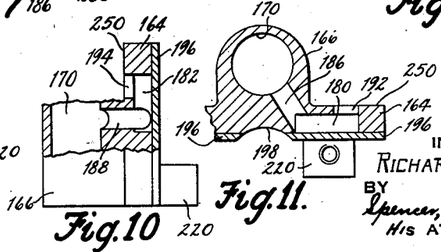

For specific description of the governor structure, reference is now made to Figs. 4 to 11 inclusive, where 164 refers to a plate having a rib or boss 166 extending from one side thereof and designed to nest in a socket or well 168 of the plate 136 and against the pad 138 as will be presently explained. The boss 166 is drilled out at 170 to receive the porting sleeve 42 in a press fit relation as shown in Fig. 4, where the sleeve provides annular exterior grooves 172, 174 and 176 into which the control ports 44, 46 and the pressure port 48 opens respectively. The opposite side of the plate 164 is grooved as shown in Fig. 7, such as at 178, 180 and 182, and through holes are drilled to connect those grooves with the bore 170 at the proper point to register with the annular grooves of the porting sleeve 42. Thus, at one end of the groove 178 there is a hole 184 connecting with the bore 170 at such location as to connect or register with groove 172 of the sleeve 42, while a hole 185 in one end of 180 registers for connection with the groove 174, and hole 188 in one end of 182 connects with groove 176. It will be observed that all of the grooves 178 to 182 extend from the proximity of the central part of the plate where they each connect with the bore 170 to a point over the thinner part or flange of the plate where each is provided in the opposite end with holes 190, 192 and 194 respectively as shown in Figs. 9, 10 and 11. A cover plate 196 is then secured to the face of the plate 164 so as to cover all of the passages formed by the grooves and holes. Machining or grooving as at 198 makes for compact arrangement of spring 56 that rests upon an adjustable seat 200 carried by a screw stud 202 supported in a plate 204 located in a notch 206 of the edge of plate 164 at one end of the bore 170. The plate 204 is attached by a screw device 208 threaded into the body of the plate 164, and ends in a depending lug or tongue 210 engaging a notch of the seat 200 which prevents the seat turning when the screw stud is turned over ratchet means 212 holding it in place. Depressing the screw stud 202 will displace the ratchet means and permit rotation of the stud relative to the seat 200 for adjustment of the spring 56.

The other end of the spring 56 engages a seat or pad 214 fixed to an intermediate part of the lever 58 where there is also secured the middle leg 215 of a flat leaf spring member 216 of M-shape, the end legs 218 of which are secured to studs or posts 220 mounted on the face of the plates 164 and 196. These posts are secured in holes 222 at the lower edge of the plates and have cross apertures to receive screw devices 224 that pass through lugs 226 of way pieces 228 and the ends of legs 211 on the spring 216 to clamp them in place. The way-pieces are of sufficient length to pass across the bottom edge of the assembled plates 164 and 196 to engage locating notches 230 by which the ways are kept rigidly in parallelism and perpendicular to plates. The ways are of channel section as shown in Fig. 5 and are adapted to freely guide the rolling motion of the carriage 162 in its movement along the length of the lever 58. The carriage is mounted on two pairs of rollers 232 within the channel of the ways 228 and supports the fulcrum roller 64 on the same shaft 234, while the second shaft 236 supports a roller stop 238 for the valve member in it slow pitch position. Slots 240 in the web of the ways cooperate with a cross pin 242 on the carriage to determine the extent of travel that the carriage can encounter along the ways and consequently along the lever 58.

This governor mechanism is adapted for mounting on the plate 136 since the rear side of the plate 164 is machined flat at 250 to closely engage the machine surface 252 of the plate 136, and so that the holes 190 to 194 register with appropriate openings to the passages 132 for completion of the fluid circuit shown in Fig. 1. Hold-down devices, such as screws 254 pass through apertures 256 in the plate 164 to securely hold the unit in place, the rib portion 166 nesting in the well 168 of the plate. When so mounted, the basic speed at which the governor unit is to control may be selected from the cockpit which acts through the lever 160, the control shafts 156 and the carriage 162 to move the fulcrum 64 along the lever 58. The speed having been selected by positioning the fulcrum, rotation of the propeller carries with it the governor mechanism, in which the valve member 50 responding to the action of centrifugal force and opposing spring force assumes an equilibrium or on-speed position in which the lands 52 and 54 cover both control ports 44 and 46. Should an off-speed condition arise, the member 50 moves along the bore of the porting sleeve to properly open the ports for distribution of pressure fluid to the torque-unit in correcting for the off-speed, as has been hereinbefore described.

While the embodiment of the present invention as herein disclosed, constitutes a preferred form, it is to be understood that other forms might be adopted, all coming within the scope of the claims which follow.

What is claimed is as follows:

1. In a system of control for variable load devices having tendencies to shift to a lesser load condition, the combination comprising, a double acting torque unit for adjusting the device in both increase and decrease load directions, a single source of torque-unit-operating-force, a governor having a centrifugally operated and yieldingly opposed member for selectively distributing the operating force to one side or the other of the torque-unit in order to obtain load increase and load decrease, said member including means operable, when said governor is distributing force to assist the device in its tendency to shift to said one end of the load range, to retard that tendency of the device to shift.

2. In a system of control for variable load devices having tendencies to shift to a lesser load condition, the combination comprising, a double acting torque unit for adjusting the device in both increase and decrease load directions, a source of power providing a surplus of torque-unit-operating force, means for controlling the operating force to a predetermined potential by selecting a portion of the source of power for application to the torque-unit and including means for increasing the potential of the operating force to a value above the predetermined value in response to increased demands of the torque-unit by selecting a greater portion of the source of power, a governor having a centrifugally operated and yieldingly opposed member for selectively distributing the operating force to the torque-unit to effect load increase and load decrease in response to speed change, said governor being operable when distributing operating force to assist the tendency of the device to shift for retarding that tendency of the device to shift, and having means operable, when distributing operating force to oppose the tendency of said device to shift, to effect operation of the force controlling means for increasing the potential value.

3. In a system of control for variable load devices having tendencies to shift to a lesser load condition, the combination comprising, a double acting torque unit for adjusting the device in both increase and decrease load directions, a surplus source of torque-unit-operating-force, means separating the surplus for limiting the operating force to a value suitable to effect movement of the torque-unit in accordance with the work to be done by it, and including a normally low value for assisting the tendency of the device movement, and a variable higher value for opposing the tendency of device movement, a governor having a centrifugally operated and yieldingly opposed member for selectively distributing the operating force after the surplus has been separated and thus limited to the torque-unit in order to obtain device movement in accordance with speed variation, said member including means for restricting the rate of movement of the torque-unit when the member is shifted to distribute the operating force in assistance of the device tendency.

4. In a system of control for variable load devices having tendencies to shift to a lesser load condition, the combination comprising, a double acting torque unit for adjusting the device in both increase and decrease load directions, a source of torque-unit-operating-force, means for limiting the operating force to a value suitable to effect movement of the torque-unit in accordance with the work to be done by it, and including a normally low value for assisting the tendency of device movement, and a variable higher value for opposing the tendency of device movement, a governor having a spring and a member for selectively distributing the operating force to the torque-unit in order to obtain load change in accordance with speed variation, said member being under joint control by two normally opposed forces, one force being the force of the spring and the other being centrifugal force acting upon said member, means articulated to the member for transmitting the force of the spring to the member, means including said articulation for introducing a slight lateral thrust to said member for damping its movement by the centrifugal or spring force, and means included in said member for restricting the operation of said torque-unit when said member is shifted to distribute the operating force in assistance to the tendency of the device to shift.

5. In a system of control for variable load devices having tendencies to shift to a lesser load condition, the combination comprising, a double acting torque unit for adjusting the device in both increase and decrease load directions, a source of fluid under pressure providing a surplus of pressure for operating the torque-units, a governor having a valve member centrifugally operated and yieldingly opposed for selectively distributing the fluid pressure to the torque-unit in order to obtain load change in accordance with speed change, means operable when said valve member distributes fluid pressure to assist the device tendency, to then restrict operation of the torque-unit.

6. In a system of control for variable load devices having tendencies to shift to a lesser load condition, the combination comprising, a double acting torque unit for adjusting the device in both increase and decrease load directions, a source of surplus fluid under pressure for operating the torque-units, a governor having a valve member centrifugally operated and yieldingly opposed for selectively distributing the fluid pressure to the torque-unit in order to obtain a load change in accordance with speed change, means so controlling the fluid pressure delivered to the governor by diverting a substantial surplus of the pressure source that a normal low pressure will be available at all times, and by diverting a lesser surplus that a variable increased pressure will be available when the valve member directs the fluid pressure to the torque-unit for opposing the tendency of device movement, and means operable when said valve member distributes said normal pressure to the torque-unit assisting the tendency of device movement for restricting the movement of said torque-unit.

7. In a system of control for variable load devices having tendencies to shift to a lesser load condition, the combination comprising, a double acting torque unit for adjusting the device in both increase and decrease load directions, a source of surplus fluid under pressure for operating the torque-units, a governor mechanism for distributing a part of the fluid under pressure to the torque-unit in order to obtain a load change in accordance with speed change, said mechanism including control ports with connections to the torque-unit, and a valve member with lands normally covering said control ports when the valve is in the on-speed position, and means operable when the governor mechanism is distributing fluid pressure to the torque unit to assist the device tendency, for restricting the operation of the torque-unit by altering the escape of surplus fluid under pressure.

8. The combination set forth in claim 7, wherein the means for restricting operation of the torque-unit include means for retarding the drain of pressure fluid from the torque-unit.

9. The combination set forth in claim 7, wherein the restricting means comprises an additional land on the valve member and a restricted passage operable to connect with one of the control ports when the valve member is shifted in one direction from the on-speed positioning, whereby the drain of pressure fluid from the torque-unit through that control port is delayed.

10. In a system of control for variable load devices having tendencies to shift to a lesser load condition, the combination comprising, a double acting torque unit for adjusting the device in both increase and decrease load directions, a fluid pressure source providing a surplus over an essential potential for operating the torque-units, a governor for distributing the pressure source to either chamber of the torque-unit in order to obtain load shift in accordance with change of speed, said governor comprising a body with a pair of control ports each leading to one chamber of the torque unit, and a valve member normally covering the control ports when in the on-speed position and operable under joint control of two normally opposed forces for opening either control port to the pressure source, one force being the force of a spring that tends to move the valve to a position for decrease load and the other force being centrifugal force that tends to move the valve to a position for increase load, means coupled with the valve member for transmitting the spring force thereto and for resisting movement of the valve member, pressure control means for limiting the pressure source to a normal value by diverting all of the surplus from the governor when the governor distributes the pressure to the load decrease port in assistance of the tendency of device movement, and for variably increasing the pressure to a higher value by diverting only a part of the surplus from the governor when the governor distributes the pressure to the increase load control port in opposition to the tendency of device movement, and means including a part of the valve member adapted to cooperate with the increase-load control port when the valve member is distributing pressure fluid for decrease load change, to control the rate of decrease load change.

11. The combination set forth in claim 10, in which the means for coupling the spring force with the valve member for resisting movement of the valve member includes a lever pivoted to the valve member by a pin and slot provisions, the slot being provided by the lever and inclined with respect to the valve member so as to cam the valve member laterally with respect to its path of movement, whereby the valve member is so cocked as to deprive it of its freedom of movement.

12. The combination set forth in claim 10, in which the part of the valve member adapted to cooperate with the increase-load control port for controlling the rate of load change comprises a hollowed extension of the valve member, and an additional land axially spaced from the land adapted to cover the increase-load control port, with small apertures connecting from between those lands to the hollow of the valve member, such that shift of the valve member to effect drain of pressure fluid from the torque-unit through the increase-load port is thereby restricted.

13. In a system of control for variable load devices requiring a substantially greater force application to shift for increase load setting than is needed to shift for decrease load setting, comprising in combination, a double acting torque motor having separate chambers for effecting increase and decrease load change, a single fluid pressure pump whose output provides a surplus pressure component over the essential pressure components required to effect either of the load settings, a variable pressure control valve for separating the surplus component from the essential component required to effect a decrease load shift, and for separating a different surplus component from a different essential component required to effect an increase load shift, a governor valve always exposed to the essential component for applying the essential component to one or the other of the torque unit chambers, and means operable when the governor applies the essential component to the torque unit chamber for load increase setting for assisting the variable pressure valve in reducing the surplus component, and means brought into operation when the governor valve applies an essential component to the torque unit chamber for decreasing the setting for restricting the rate of decrease load setting.

14. A governor for fluid pressure, comprising in combination, a support plate having interior channels one end of which opens to one face of the plate, a medial boss extending across the plate and having a bore parallel with the face of the plate, passages connecting each of the channels with the said bore at spaced points throughout its length, a porting sleeve located in the bore and having ports opening from its bore to the ends of the passages opening into the plate bore, a valve plunger shiftably supported within the bore of the porting sleeve and having a pair of spaced lands adapted normally to cover the end ports of said porting sleeve, a pair of brackets extending from the plate, one of said brackets supporting a movable carriage, a lever having one end resting on the carriage and the other end connected to an end of the valve plunger, and yielding means disposed between the lever and the other bracket to urge the lever to engage the carriage, said valve plunger being adapted to move along the bore of the porting sleeve to uncover either of the normally covered ports, a third land situated on the valve plunger near one of the first mentioned lands, and a restricted passage opening from between the said lands to the outside of the valve plunger.

15. The combination set forth in claim 14 wherein the lever connected to the end of the valve plunger embraces a cross pin in the end of the valve plunger and a slot in the end of the lever, said slot being at a slight angle to the length of the lever so that spring pressure against the lever cams the valve plunger against one side of the porting sleeve.

16. A governor for fluid pressure, comprising in combination, a body member providing a cylindrical bore, fluid passages providing a middle and two spaced openings along the length of said bore, a porting sleeve located in the bore and providing ports each of which communicate with one of said openings, a cylindrical valve plunger shiftably supported within the porting sleeve, a pair of spaced lands on the valve plunger adapted to cover the end ports of said sleeve, and a third land on the valve plunger and spaced from one of said pair of lands, an axial bore in one end of said valve plunger, and a cross bore connecting said axial bore with the space between the third land and the adjacent end land.

17. In a fluid pressure system having a high capacity pump and a governor valve for applying pressures of different potential to each of two control ports, the combination comprising, a valve plunger having a pair of spaced lands normally covering the two control ports and adapted upon change of position to uncover one or the other of said control ports and connect it with a pressure supply line, an additional land on the plunger outward of one of the pair of control lands, a restricted passage opening outward of said one paired land by-passing the additional land so that shifting of the valve plunger to connect the other control port with the pressure supply line will effect retarded drain from the adjacent control port, a variable pressure control valve between the pump and the supply line to the valve plunger for supplying a relatively low essential pressure potential to one of the control ports when the valve plunger connects it with the supply line, and fluid connections from the other control port to the variable pressure control valve for increasing the essential pressure potential in the supply line when the valve plunger connects the said other control port with the pressure supply line.

18. In a fluid pressure system having a high capacity pump and a governor valve for applying pressures of different potential to each of two control ports, the combination comprising, a shiftable valve plunger exposed to a pressure supply line from the pump and having a pair of spaced lands covering the control ports, a variable pressure control valve between the pump output and the pressure supply line for limiting the potential of pressure in the pressure supply line to that essential for application to either of the control ports, and fluid connections between the control port requiring the higher pressure application and the variable pressure control valve for assisting the said pressure control valve in increasing the essential pressure potential in the supply line when the valve plunger shifts to connect the control port requiring the higher pressure application to the pressure supply line, said valve plunger having a restricted passage connectible with the control port requiring the higher pressure application to dampen drain therefrom when the valve plunger shifts to connect the other control port with the pressure supply line.

19. A fluid pressure mechanism for controlling the rate of pitch change in a variable pitch aircraft propeller, comprising reversible acting pitch changing fluid pressure motors, a regulator rotatable with the propeller and including a fluid pressure source, a governor valve unit carried by the regulator and having a pair of control ports for distributing the fluid pressure to either side of the pitch changing motors in response to change in speed of regulator rotation for maintaining a substantially constant propeller speed, means in said unit for delaying the distribution to said control ports including a porting sleeve, a valve plunger, and a spring pressed lever articulated with the plunger, said articulation comprising a pivot pin carried by the valve plunger, and a slot in the lever disposed at an angle to the perpendicular of plunger movement so as to impart a camming action of the plunger against the side of the porting sleeve, and orifice means in said unit for limiting the rate of flow of fluid pressure from one of the control ports when the governor valve is distributing fluid pressure to the other control port.

20. A fluid pressure mechanism for controlling the rate of pitch change in a variable pitch aircraft propeller, comprising reversible acting pitch changing fluid pressure motors, a regulator rotatable with the propeller and including a fluid pressure source, a governor valve unit carried by the regulator and having a pair of control ports for distributing the fluid pressure to either side of the pitch changing motors in response to change in speed of regulator rotation for maintaining a substantially constant propeller speed, said governor valve unit comprising a plate channeled for fluid passage to and from the control ports, said plate having a hollow boss radially disposed on a conduit support carried by the regulator for connecting the channels with conduits, a spring and a valve plunger urged thereby movable along the hollow of the boss for selectively connecting the channels, and a restricted aperture in the valve plunger adapted to register with one of the channels from which fluid is flowing upon predetermined movement of the valve plunger to distribute fluid to the channel tending to decrease propeller pitch whereby the rate of fluid flow from one of the control ports is limited when the governor valve is distributing fluid pressure to the other control port, and means in said unit for delaying the distribution to said control ports.

21. A fluid pressure mechanism for controlling the rate of pitch change in a variable pitch aircraft propeller, comprising reversible acting pitch changing fluid pressure motors, a regulator rotatable with the propeller and including a fluid pressure source, a governor valve unit carried by the regulator and having a pair of control ports for distributing the fluid pressure to either side of the pitch changing motors in response to change in speed of regulator rotation for maintaining a substantially constant propeller speed, said governor valve unit comprising a radially disposed bore with ports leading to the pressure source and the control ports, a valve plunger slidable in and out of the bore in response to domination of spring force or opposed centrifugal force and adapted in the on-speed condition to govern the control ports, a lever for transmitting the spring force to the valve member and having connection therewith through a camming means for inducing cock of the plunger against one side of the bore to reduce its freedom of inward and outward movement, an additional land on the valve plunger in close proximity to a land of one of the control ports adapted to approach said one control port when the valve plunger moves in one direction, and a restricted opening in the valve plunger extending from between the proximate lands to reduce the rate of flow through one said control port from said fluid pressure motors when the valve member has moved in said one direction to distribute flow tending to decrease propeller pitch.

22. A fluid pressure mechanism for controlling the rate of pitch change in a variable pitch aircraft propeller, comprising reversible acting pitch changing fluid pressure motors, a regulator rotatable with the propeller and including a fluid pressure source, a governor valve unit carried by the regulator and having a pair of control ports for distributing the fluid pressure to either side of the pitch changing motors in response to change in speed of regulator rotation for maintaining a substantially constant propeller speed, means in said unit for delaying the distribution to said control ports and means for limiting the rate of fluid flow from one of the control ports including a porting sleeve having openings for admission of source pressure and for exit of fluid pressure to the control ports, and a valve plunger slidable in the sleeve having lands adapted to stop flow of pressure fluid to the control ports when the valve is in the on-speed position, with an additional land in close proximity to one of the control port lands adapted to approach the adjacent opening of the sleeve when the plunger moves to said predetermined distributing condition, and restricted openings between the proximate lands brought into action when the valve plunger is in the predetermined distributing condition for reducing the rate of flow of fluid pressure through the associated control port from said fluid pressure motors when the plunger distributes flow tending to decrease propeller pitch.

RICHARD E. MOORE.

REFERENCES CITED

The following references are of record in the file of this patent:

UNITED STATES PATENTS

| Number | Name | Date |
|---|---|---|
| 1,893,612 | Caldwell | Jan. 10, 1933 |
| 2,028,766 | Ernst et al. | Jan. 28, 1936 |
| 2,163,663 | Caldwell | June 27, 1939 |
| 2,204,639 | Woodward | June 18, 1940 |
| 2,243,852 | Caldwell et al. | June 3, 1941 |
| 2,264,089 | Martin | Nov. 25, 1941 |
| 2,343,382 | Martin | Mar. 7, 1944 |
| 2,364,672 | Stevenson | Dec. 12, 1944 |
| 2,387,896 | Giger | Oct. 30, 1945 |
| 2,391,699 | Haines et al. | Dec. 25, 1945 |
| 2,402,065 | Martin | June 11, 1946 |
| 2,461,791 | Warde | Feb. 15, 1949 |
| 2,467,964 | Carson et al. | Apr. 19, 1949 |

FOREIGN PATENTS

| Number | Country | Date |
|---|---|---|
| 501,127 | Great Britain | Feb. 20, 1939 |
| 558,741 | Great Britain | Jan. 19, 1944 |